United States Patent [19]

Schneider

[11] Patent Number: 5,076,180

[45] Date of Patent: Dec. 31, 1991

[54] TRASH CLEARING BRUSH UNIT FOR A PLANTER UNIT

[75] Inventor: John T. Schneider, Shirley, Ill.

[73] Assignee: Yetter Manufacture Company, Colchester, Ill.

[21] Appl. No.: 598,843

[22] Filed: Oct. 15, 1990

[51] Int. Cl.$^5$ .............................................. A01C 5/00
[52] U.S. Cl. ..................................... 111/139; 172/29; 172/543; 172/747; 172/744
[58] Field of Search .................... 111/139, 142, 157; 172/29, 519, 543, 556, 747, 744

[56] References Cited

U.S. PATENT DOCUMENTS

| | | | |
|---|---|---|---|
| 2,882,982 | 4/1959 | Hobbs | 172/543 X |
| 3,010,526 | 11/1961 | Van der Lely et al. | 172/543 |
| 3,314,486 | 4/1967 | Remy | 172/543 |
| 4,114,697 | 9/1978 | Carlucci | 172/543 |
| 4,425,973 | 1/1984 | Williams et al. | 172/574 |
| 4,483,401 | 11/1984 | Robertson | 172/574 |
| 4,520,620 | 6/1985 | Gessel et al. | 56/400 |
| 4,562,780 | 1/1986 | Leiblich | 111/88 |
| 4,589,791 | 5/1986 | Wiehrauch | 300/21 X |
| 4,781,129 | 11/1988 | Swanson et al. | 111/73 |
| 4,785,890 | 11/1988 | Martin | 172/29 |

OTHER PUBLICATIONS

"Yetter's Trash Brushes" article in Farm Journal, Apr. 1990, p. 28.
"Brush Cultivator" article in Farm Show, vol. 14, No. 1, Jan. 1990.

Primary Examiner—Dennis L. Taylor
Assistant Examiner—Jeffrey L. Thompson
Attorney, Agent, or Firm—Lee, Mann, Smith, McWilliams & Sweeney

[57] ABSTRACT

A trash clearing brush unit for use ahead of a planter unit including a pair of circular brushes rotatably mounted to a vertical support bar and angularly inclined toward one another. The support bar is attachable to a planter unit and vertically adjustable with respect thereto.

10 Claims, 1 Drawing Sheet

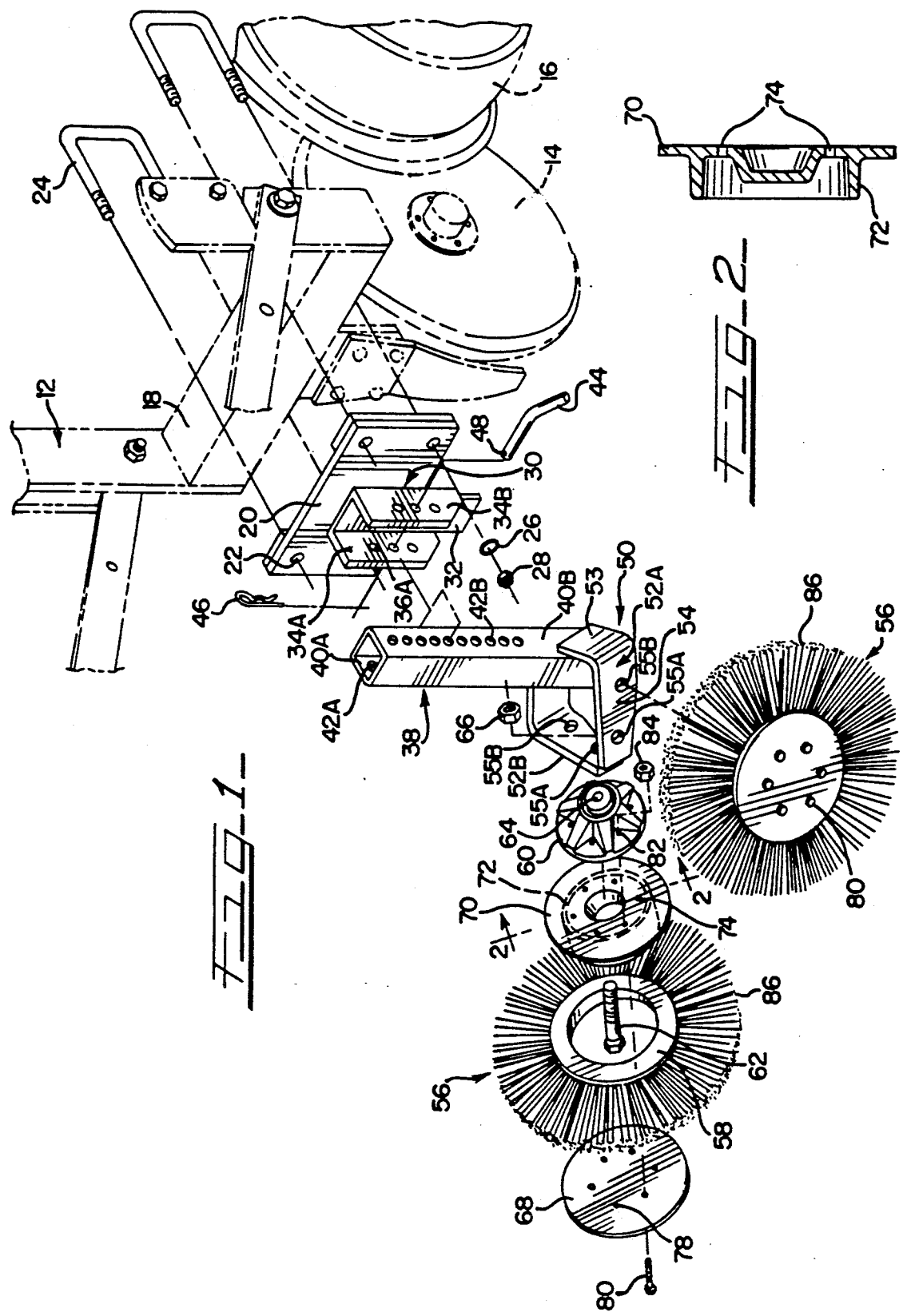

TRASH CLEARING BRUSH UNIT FOR A PLANTER UNIT

BACKGROUND OF THE INVENTION

The present invention is directed to a trash clearing brush unit for use ahead of a planter. Numerous arrangements of this general type are shown in the prior art U.S. Pat. Nos. 4,114,697, 4,425,973, 4,483,401, 4,562,780, 4,781,129 and 4,785,890. None of these patents discloses the features of the present invention.

SUMMARY OF THE INVENTION

The present invention is particularly useful in connection with minimum or no tillage farming practices. Minimum and no tillage farming utilizes little or no plowing and leaves crop residue or trash on the field surface to help prevent erosion and to fertilize the soil and provide moisture retention. In order that a seed planter may operate properly under such conditions as these, a path free of crop residue and debris must be cleared ahead of the planter unit.

The trash clearing brush unit of the present invention includes a mounting plate for releasably securing the device to the planter. A vertical support bar is adapted to be fastened to the mounting plate and is vertically adjustable with respect to the mounting plate and the planter unit. A V-shaped bracket extends outwardly from the support bar and includes a pair of support members angularly inclined toward one another. A pair of circular brushes is provided. Each brush includes a circular mounting ring releasably and rotatably securable to one of the support members. A plurality of flexible bristles are secured to and extend outwardly from the mounting ring. Adjustment of the support bar is effected such that the bristles are positioned to sweep the ground surface to laterally displace debris and clear a path for the planter without displacing or penetrating the ground soil.

BRIEF DESCRIPTION OF THE DRAWING

FIG. 1 shows an exploded perspective view of the trash clearing brush unit of the present invention attached to a planter, a portion of which is shown in phantom.

FIG. 2 shows a cross-section taken along lines 2—2 of the adaptor shown in FIG. 1.

DETAILED DESCRIPTION OF THE INVENTION

The drawing illustrates the trash clearing brush unit of the present invention, generally designated by the numeral 10, and certain portions of a planter, generally designated by the numeral 12, to which the trash clearing brush unit 10 is attachable. The planter 12 includes at least one pair of opener discs 14, at least one pair of depth gauge wheels 16 and a horizontally-disposed crossbar 18 positioned forwardly of the discs 14.

The trash clearing brush unit 10 includes a substantially rectangular mounting plate 20 having a plurality of apertures 22 defined therethrough. The mounting plate 20 is rigidly secured to the crossbar 18 by means of U-bolts 24 which are inserted through respective apertures 22 and fastened in place by washers 26 and nuts 28. The mounting plate 20 is provided with a centrally disposed mounting bracket 30 which extends outwardly from the front face thereof. The mounting bracket 30 includes a vertical base member 32 and a pair of outwardly-extending, opposing, side members 34A and 34B. The side members 34A and 34B are each provided with a plurality of apertures 36A and 36B respectively, defined therethrough in vertically-disposed relation.

A hollow, vertical support bar 38, having a substantially square cross-section, is provided. Opposing walls 40A and 40B of the support bar 38 are provided with a plurality of corresponding, vertically-disposed circular openings 42A and 42B, respectively. The support bar 38 is adapted to be mounted between the side members 34A and 34B of the mounting bracket 30. A pair of openings 42A and 42B of the support bar 38 is aligned with a pair of apertures 36A and 36B of the mounting bracket 30 and a pin 44 is inserted therethrough to retain the support bar 38 in the selected position. A clip 46 is fit into an aperture 48 defined through the pin 44 to prevent the pin 44 from slipping out.

A substantially V-shaped bracket 50 extends outwardly and downwardly from the lower end of the support bar 38. The V-bracket 50 includes a pair of support members 52A and 52B. The support members 52 are generally L-shaped and define a short arm 53 and a long arm 54. The short arm 53 of each support member 52 is rigidly secured to an opposing wall 40 of the support bar 38 at the lower end thereof by welding or other suitable means. The long arms 54 meet at the vertical plane of the path of travel of the opener discs 14 so that the support members 52 are angularly inclined toward one another at an included angle of approximately 74°. The support members 52 are tilted downwardly with respect to the horizontal plane of the crossbar 18 at an angle of approximately 17°. A pair of front apertures 55A and a pair of rear apertures 55B, the purposes of which will be explained below, are defined through each long arm 54 of the support members 52.

A pair of circular brushes 56 is provided. Each brush 56 includes a circular mounting ring 58 adapted to be releasably and rotatably secured to one of the support members 52 of the V-bracket 50 by means of a hub 60. The mounting ring 58 may be comprised of steel or other suitable material. A ball bearing arrangement of standard construction (not shown) is provided inside the hub 60 to permit it to rotate. The hub 60 is secured to a support member 52 by a bolt 62 which extends through a centrally-defined aperture 64 in the hub 60 and through one of the apertures 55A or 55B in the support member 52. A nut 66 is fastened about the end of the bolt 62 to hold the hub 60 in place.

The mounting ring 58 is secured to the hub 60 by means of a circular adapter cover 68 and a circular adapter 70. The cover 68 and adapter 70 both have outer diameters approximately equal to the outer diameter of the mounting ring 58. The adapter 70, best shown in FIG. 2, defines an outwardly-extending, circular wall 72 having a diameter approximately equal to the inner diameter of the mounting ring 58. A plurality of apertures 74 are defined through the cap 70 within the periphery of the circular wall 72. The adapter cover 68 defines a plurality of apertures 78 which correspond to the apertures 74 in the adapter 70.

The mounting ring 58 is sandwiched between the adaptor cap 70 and the adapter plate 68. Bolts 80 are inserted through the plate apertures 78, through the cap apertures 74 and through corresponding apertures 82 defined through the hub 60. Nuts 84 are fastened about the ends of the bolts 80, thereby securing the mounting ring 58 to the hub 60 which is rotatably fastened to a support member 52.

Flexible bristles 86 are crimped into and about and extend radially outwardly from the outer periphery of the mounting ring 58. The bristles 86 of the preferred embodiment are made of virgin polypropylene, but it is understood that other plastics or suitable material may be used as well, for example, steel wire bristles may be used. Generally, it has been found that bristles 86 having a free length of approximately three inches work well in the preferred embodiment. The bristles 86 form a brush which is approximately one inch wide. Each bristle 86 has a substantially oval cross-section measuring approximately 0.06" by 0.09". The flexible bristles 86 must be stiff enough to displace trash, but flexible enough to sweep the ground surface without penetrating or displacing the soil. Bristles 86 having a tensile strength of approximately 35,000 pounds per square inch have been found to provide the requisite stiffness and suitable wear characteristics.

In the preferred embodiment, one of the brushes 56 is attached through a front aperture 55A, thereby providing a leading edge, and the other brush 56 is attached through a rear aperture 55B, thereby providing a trailing edge.

In an alternate embodiment, both pairs of brushes 56 are mounted either through the front apertures 55A or through the rear apertures 55B. In the alternate embodiment, when the brushes 56 are in place on the support arms 52, the outer peripheries defined by the outer edges of the bristles 86 of each brush 56 overlap slightly. The degree of overlap can be adjusted by moving the brushes 56 from attachment through front apertures 55A to attachment through rear apertures 55B of the support members 52. Greater overlap is achieved when the brushes are attached to the support arms 52 via front apertures 55A.

The operation of the trash clearing device 10 will now be explained. The support bar 38 is adjusted to permit the bristles 86 to contact the ground surface. Factors which determine the height at which the brushes 56 should be placed include the depth of the crop residue or debris (trash), various operating conditions of the planter such as speed and moisture conditions and the presence of obstacles such as rocks. When the planter 12 begins to move forwardly, the contact of the bristles 86 with the ground surface causes the brushes 56 to rotate. The bristles 86 of the brushes 56, due to their flexible construction, then brush or sweep the ground surface thereby displacing the residue and debris laterally because of the converging angle at which the brushes 56 are disposed and clear a path for the disc openers 14 of the planter 12 without penetrating or displacing the ground soil.

Thus, it has been shown that the present invention provides a trash clearing brush unit for sweeping the ground surface ahead of a planter to laterally displace debris and clear a path for the opener discs of the planter without displacing or penetrating the soil.

Various features of the invention have been particularly shown and described in connection with the illustrated embodiment of the invention, however, it must be understood that this particular arrangement merely illustrates and that the invention is to be given its fullest interpretation within the terms of the appended claims.

What is claimed is:

1. A trash clearing brush unit for use ahead of a planter, said brush unit including mounting means for releasably securing said brush unit to said planter; a vertical support bar adapted to be connected to said mounting means, said support bar being vertically adjustable with respect to said mounting means; a V-shaped bracket extending outwardly from said support bar, said bracket including a pair of support members angularly inclined toward each other; a pair of circular brushes, each brush having a circular mounting ring having an inner diameter and a plurality of flexible bristles secured to and extending radially outwardly from said mounting ring; a circular adapter located on one side of each said mounting ring, each said adapter including an outwardly extending wall adapted to fit closely within said inner diameter of said mounting ring; an adapter cover respectively located on the other side of each said mounting ring from said circular adapter and fastened to said circular adapter such that each said mounting ring is gripped between its corresponding adapter and adapter cover; a hub releasably and rotatably securable to each respective support arm; and means for fastening each respective adapter and adapter cover to a respective hub such that each said brush is rotatably mounted to a respective support member, whereby said flexible bristles are operative to permit said brushes to sweep the ground surface to laterally displace debris and clear a path for said planter without displacing or penetrating the ground soil.

2. The trash clearing brush unit of claim 1 wherein said mounting means includes a mounting plate releasably securable to said planter and a mounting bracket extending outwardly from said mounting plate adapted to receive said vertical support bar.

3. The trash clearing brush unit of claim 1 wherein said support members are angularly inclined toward each other at an included angle of approximately 74°.

4. The trash clearing brush unit of claim 1 wherein said support members tilt downwardly with respect to said vertical support bar at an angle of approximately 17° to the horizontal.

5. The trash clearing brush unit of claim 1 wherein said bristles have an oval cross-section.

6. The trash clearing brush unit of claim 1 wherein said bristles have a tensile strength of approximately 35,000 pounds per square inch.

7. The trash clearing brush unit of claim wherein said bristles are comprised of virgin polypropylene plastic.

8. The trash clearing brush unit of claim 1 wherein said bristles of said brushes overlap during operation and including means to adjust said overlap.

9. The trash clearing brush unit of claim 1 wherein said bristles are comprised of steel wire.

10. The trash clearing brush unit of claim 1 wherein one of said pair of circular brushes is mounted to one of said support arms so as to provide a leading edge and the other of said brushes is mounted to the other of said support arms so as to provide a trailing edge.

* * * * *